(12) United States Patent
Granat

(10) Patent No.: US 7,969,128 B2
(45) Date of Patent: Jun. 28, 2011

(54) BI-DIRECTIONAL POWER SUPPLY WITH ISOLATED OUTPUT

(75) Inventor: Stanley M. Granat, Clay, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 242 days.

(21) Appl. No.: 11/986,138

(22) Filed: Nov. 20, 2007

(65) Prior Publication Data

US 2009/0128121 A1    May 21, 2009

(51) Int. Cl.
G05F 1/59 (2006.01)
G05F 1/613 (2006.01)
(52) U.S. Cl. .......................... 323/266; 323/225; 323/271
(58) Field of Classification Search .................. 323/225, 323/265, 266, 268, 271, 282, 351, 272
See application file for complete search history.

(56) References Cited

U.S. PATENT DOCUMENTS

| 4,456,872 A | | 6/1984 | Froeschle |
| 4,636,709 A | * | 1/1987 | Ohsawa ........................ 323/267 |
| 5,684,686 A | * | 11/1997 | Reddy .............................. 363/97 |
| 5,932,995 A | * | 8/1999 | Wagoner ....................... 323/222 |
| 6,771,518 B2 | * | 8/2004 | Orr et al. .......................... 363/16 |
| 6,979,987 B2 | | 12/2005 | Kernahan et al. |
| 7,208,922 B2 | * | 4/2007 | Kalfhaus ...................... 323/222 |
| 7,245,888 B2 | * | 7/2007 | Sointula ..................... 455/127.1 |

* cited by examiner

*Primary Examiner* — Gary L Laxton
(74) *Attorney, Agent, or Firm* — Howard IP Law Group, P.C.

(57) ABSTRACT

A capacitor isolated electronic power converter includes a direct current power source in series with a first inductor; and a first switch for switching contact with a second inductor in series with the power source return; an output load in series with a third inductor which connects to a second switch for switching contact to a fourth inductor in series with the output load return; the third inductor and second switch for switching connect through a first capacitive coupling to the second inductor; and the fourth inductor and second switch for switching connect through a second capacitive coupling to the first inductor; wherein the first and second capacitive coupling isolate the power source from the output load.

17 Claims, 7 Drawing Sheets

BI-DIRECTIONAL POWER SUPPLY WITH ISOLATED OUTPUT

FIELD OF THE INVENTION

This application is related to the field of switching power converters for supplying direct current outputs where isolation between input and output is desirable.

BACKGROUND

Switched mode or buck mode converter power supplies convert DC to DC voltages. These supplies are characterized by low output ripple voltage but generally do not provide DC isolation between the input and output return. When isolation is required it is provided by multiple secondary windings in a transformer. Accommodating the isolation requirement using a transformer requires additional secondary windings, typically one winding per individual output. In a large number of instances power is provided to multiple outputs, requiring as many secondary windings as there are outputs. Multiple isolated secondary windings add design time to achieve proper turns ratio per output with respect to the common primary winding. Also, designing internal coupling of the fields within a transformer so as to be made equal for all windings complicates the design effort. Multiple isolated secondary windings built into the main transformer generally require extra output connections and added pins on the transformer header for each isolated output. Additionally, a transformer characteristically has a large footprint and as the transformer must be made even larger to accommodate multiple windings, it results in a further depreciation of power supply density. Independent diode pairs, quads or synchronous rectifiers with drive circuits and also requiring filters are further needed for each isolated output. This also increases complexity, drives up transformer design cycle times and costs, and places the design at risk, especially if an additional supply output is required later in the design cycle. This point applies to transformer design cycle redesigns.

A less complex transformer or a substitution for the transformer in a buck-derived topology configuration would be desirable. In addition to a transformer substitution, less filtering circuitry would reduce the complexity of the topology and require fewer components, increasing reliability, increasing power efficiency and decreasing cost. Outputs having either voltage polarity and that also supply stepped up or down voltages while minimizing ripple current with respect to the input are desirable features in many power supply applications.

Often there exists the dual requirement of delivering power from the power supply while removing the heat it generates. In most instances the solution is to attach the power supply device, typically its active components, such as an FET switch or gate, to a heat sink. The heat sink is then referenced to ground via the power supply chassis. In some cases, the power supply, especially the active components must be insulated from the heat sink by a thin dielectric material. These materials, often in combination with the heat sink and the components attached thereto form a capacitor; that is, the heat sink operates as one of the plates of a capacitor with the power supply (e.g., an FET drain) device operating as the other plate. If the back of the power device, which for N-channel FETs is a drain then whenever the drain voltage transitions, typically in the timeframe of hundreds of nanoseconds, the current can virtually instantaneously reach millions of amperes as determined by the relationship, C (dv/dt). Generally, this current has no direct return to ground so it circulates within the chassis causing electrical noise. This circulation is referred to as an injected chassis current. A provision for re-routing the injected chassis currents lowers radiated emissions and lowers the noise injected into other circuits in close proximity. A device that eliminates the injected currents would reduce the radiated emissions and other noise generating effects.

SUMMARY

The present invention pertains to a capacitor isolated electronic power converter having a direct current power source in series with a first inductor; and a first switch for switching contact with a second inductor in series with the power source return; an output load in series with a third inductor which connects to a second switch for switching contact to a fourth inductor in series with the output load return; said third inductor and second switch for switching connect through a first capacitive coupling to the second inductor; and said fourth inductor and second switch for switching connect through a second capacitive coupling to the first inductor; wherein the first and second capacitive coupling isolate the power source from the output load.

The present invention also pertains to a process for converting power comprising providing a path for DC current to flow during a first time period to a first inductor and a second inductor in series, the first inductor and the second inductor each having an associated separate capacitor connecting to a third and a fourth inductor respectively; and providing a path for the discharge of the energy stored in the third inductor in series with the fourth inductor and the output load; and whereby the first inductor, the second inductor, the third inductor and the fourth inductor store energy; disconnecting the path for DC current to flow during a second time period to the first inductor and the second inductor in series; and providing a path for DC current to flow to the first inductor and the associated separate capacitor and to the second inductor and the associated separate capacitor, and providing a path for the discharge of the energy stored in the third inductor in series with the fourth inductor and the output load.

BRIEF DESCRIPTION OF THE DRAWINGS

The invention is best understood from the following detailed description when read in connection with the accompanying drawings. The various features of the drawings are not specified exhaustively. On the contrary, the various features may be arbitrarily expanded or reduced for clarity. Included in the drawing are the following figures.

DETAILED DESCRIPTION OF PREFERRED EMBODIMENTS

In the figures to be discussed, the circuits and associated blocks and arrows represent functions of the apparatus according to the present invention, which may be implemented as electrical circuits and associated wires or data busses, which transport electrical signals. Alternatively, one or more associated arrows may represent communication (e.g., data flow) between software routines, particularly when the present process or apparatus or a portion thereof is embodied in a digital process.

Figure 1:
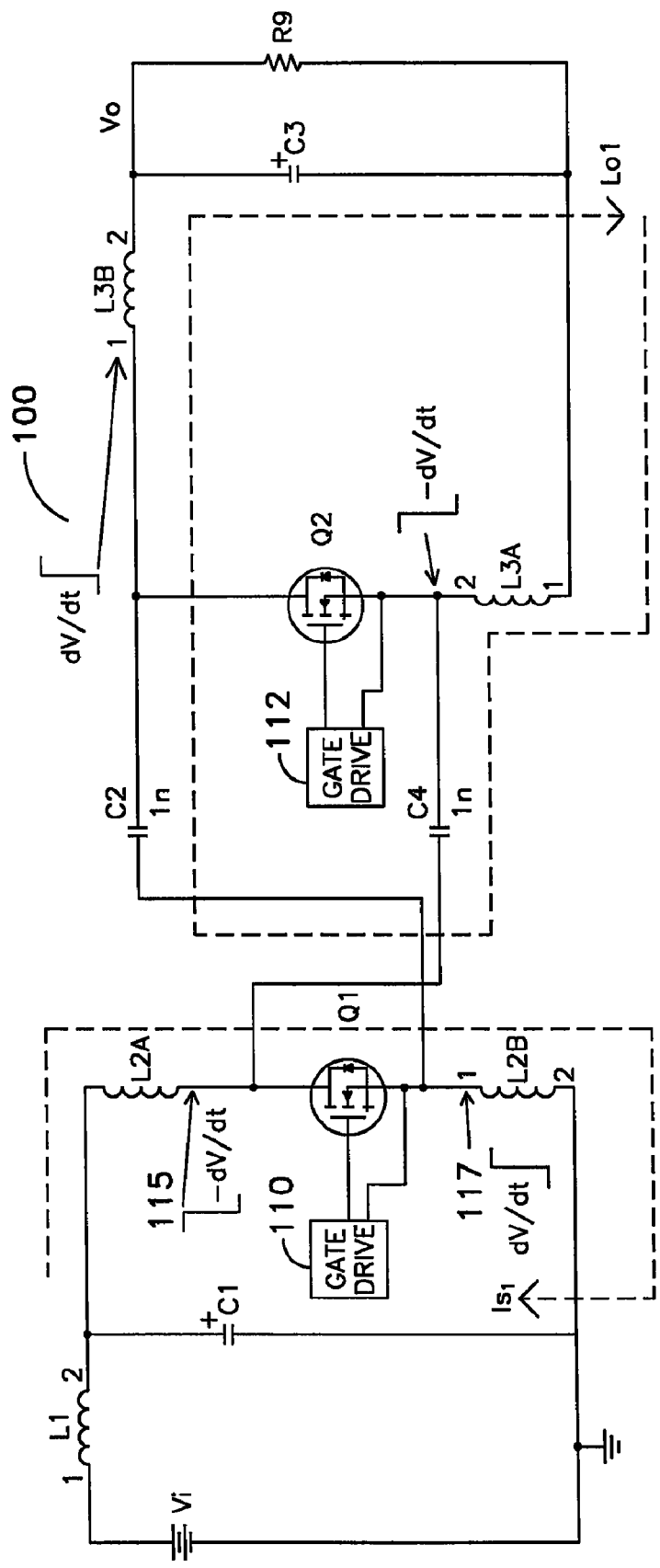
FIG. 1 is a circuit diagram of a capacitor isolated electronic power converter illustrating one cycle of current flow according to an embodiment of the invention.

FIG. 1 illustrates an exemplary embodiment of a capacitor isolated electronic power converter 100 circuit for maintaining high efficiency regulation over a range of output current requirements in accordance with one embodiment of the present invention. The exemplary circuit can operate to step up the output voltage or step down the output voltage relative to the input voltage. A direct current voltage (DC) source Vi may be provided from a conventional rectified AC source or battery. As illustrated the voltage Vi is provided by a battery. A filter composed of LC circuit components L1 and C1 serves as to reduce ripple generated by a source other than a battery. The input voltage Vi is isolated by capacitors C2 and C4 (as opposed to transformers in the prior art) from the output voltages appearing across the output load represented by resistor R9. The voltage rating of the capacitors C2 and C4 must generally be specified to meet the greater of the input or the output voltage produced by the circuit 100. The voltage at inductor L1 terminal 2 is series connected to a pair of inductors L2A and L2B through an electronic switch Q1. The inductors L2A and L2B may be wound on the same or different cores. If Q1 takes the form of a bipolar gate, (e.g., any semiconductor switch such as by way of example an FET such as a MOSFET, an SCR, or other FET type, or bipolar type device and/or associated FET technology), the connections to the inductors will be made to one of a drain or source, depending on the specific design and various voltage polarities selected by the designer. For purposes of discussion the inductors are designated as connecting to either a source or a drain. Therefore, inductor L2A connects to the drain of first bipolar gate driven switch Q1. Inductor L2B connects to the source of the first bipolar gate driven switch Q1. The drain of the first bipolar gate driven switch Q1 is coupled through a capacitor C4 to a second bipolar gate driven switch Q2 through its source. The source of the first bipolar gate driven switch Q1 is coupled through a capacitor C2 to the second bipolar gate driven switch Q2 through its drain. The second bipolar gate driven switch Q2 drain is coupled to inductor L3B, which is in series with an exemplary output network comprised of capacitor C3 and resistor R9. The second bipolar gate driven switch Q2 source is coupled through inductor L3A to the return side of the exemplary output network comprised of capacitor C3 and resistor R9. The inductors L3A and L3B may be wound on the same or different cores.

Figure 3:
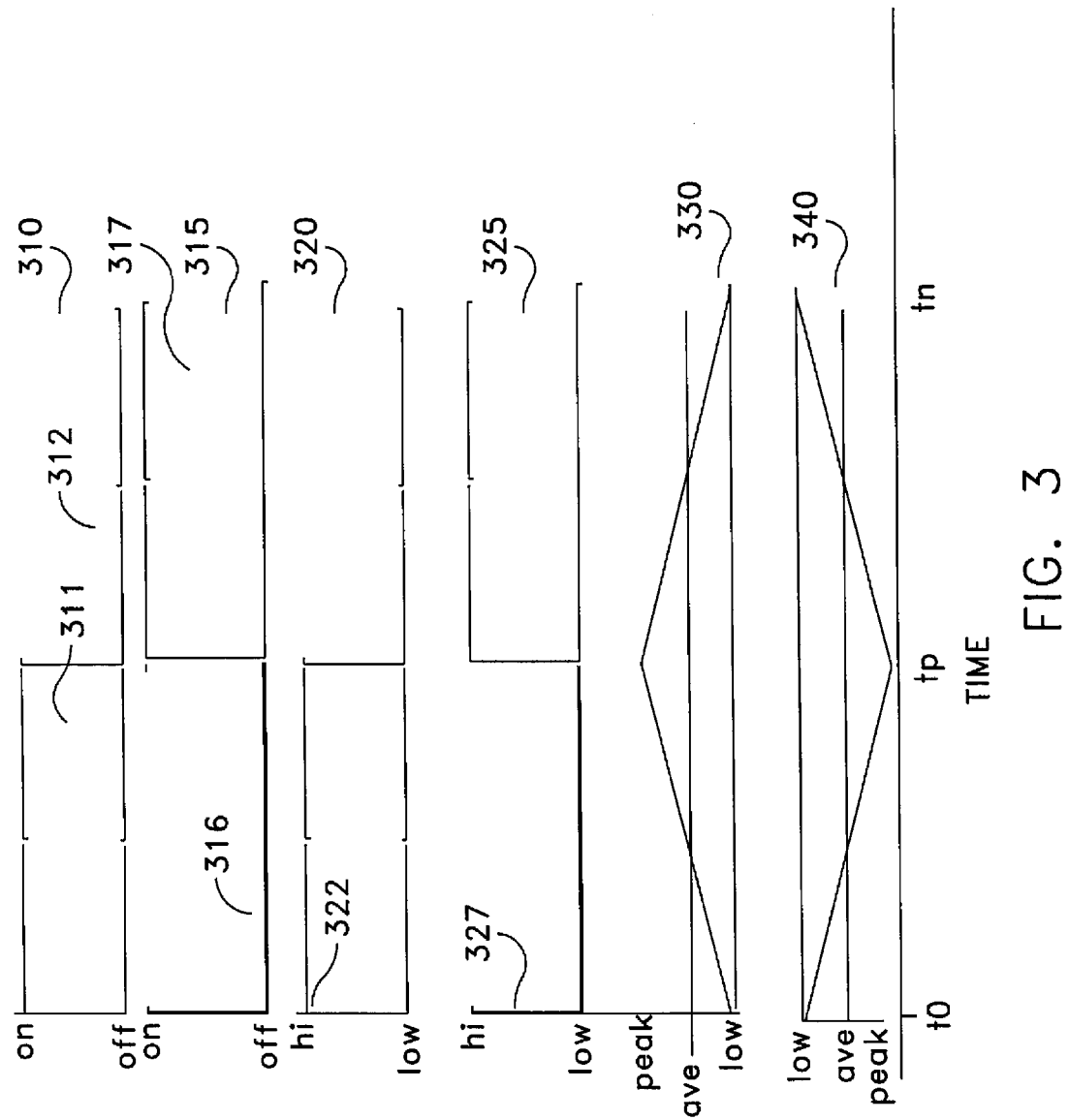
FIG. 3 is a time chart for the circuit in FIG. 1 according to an embodiment of the invention.

Referring to FIG. 1 and FIG. 3, the capacitor isolated electronic power converter circuit 100 employs two gate drivers, which in one embodiment are a pair of pulse width modulated switch drivers (PWMSD) 110, 112. As illustrated in FIG. 3, the PWMSDs generate complementary rectangular pulse trains that switch Q1 in accordance with waveshape 310 and Q2 in accordance with waveshape 315. Each gate assumes opposite states during any given time period $t_o$ through $t_n$. Initially during period $t_0$ to $t_p$ PWMSD 110 turns Q1 to an "on" state 311 (FIG. 3), and PWMSD 112 turns Q2 to an "off" state 316 (FIG. 3). When Q1 turns "on" current $Is_1$ flows through the series circuit L1, C1, L2A, Q1 and L2B, charging inductor L2A and inductor L2B during the period $t_0$ through $t_p$ as shown in FIG. 3 chart 330 and 340 respectively. Capacitor C2 and capacitor C4 serve as a floating voltage source and therefore charge inductor L3B; and likewise charge inductor L3A respectively during the period $t_0$ through $t_p$ as shown in FIG. 3 chart 330 and 340. When Q1 turns to an "on" state 311 inductor L2A terminal voltage transitions from high to low as depicted as state 327 (FIG. 3). The voltage at inductor L3A also changes from high to low as depicted as state 327.

When gate Q1 turns to an "on" state 311 the voltage at inductor L3B changes from low to high as depicted as state 320. Capacitor C2 current flow $Io_1$ is proportional to the rate of change in voltage occurring at inductor L2B terminal. When gate Q2 is off, the current $Io_1$ flows through capacitor C2, through L3B charging it to a current proportional to the inductance and the time integral of the voltage. When gate Q2 is off, the current $Io_1$ also flows through capacitor C4 and thorough inductor L3A charging it to a current proportional to the inductance and the time integral of the voltage. The positive and negative currents provided by inductor L3B and inductor L3A respectively produce a voltage charging capacitor C3 and producing a voltage at load resistor R9.

Figure 2:
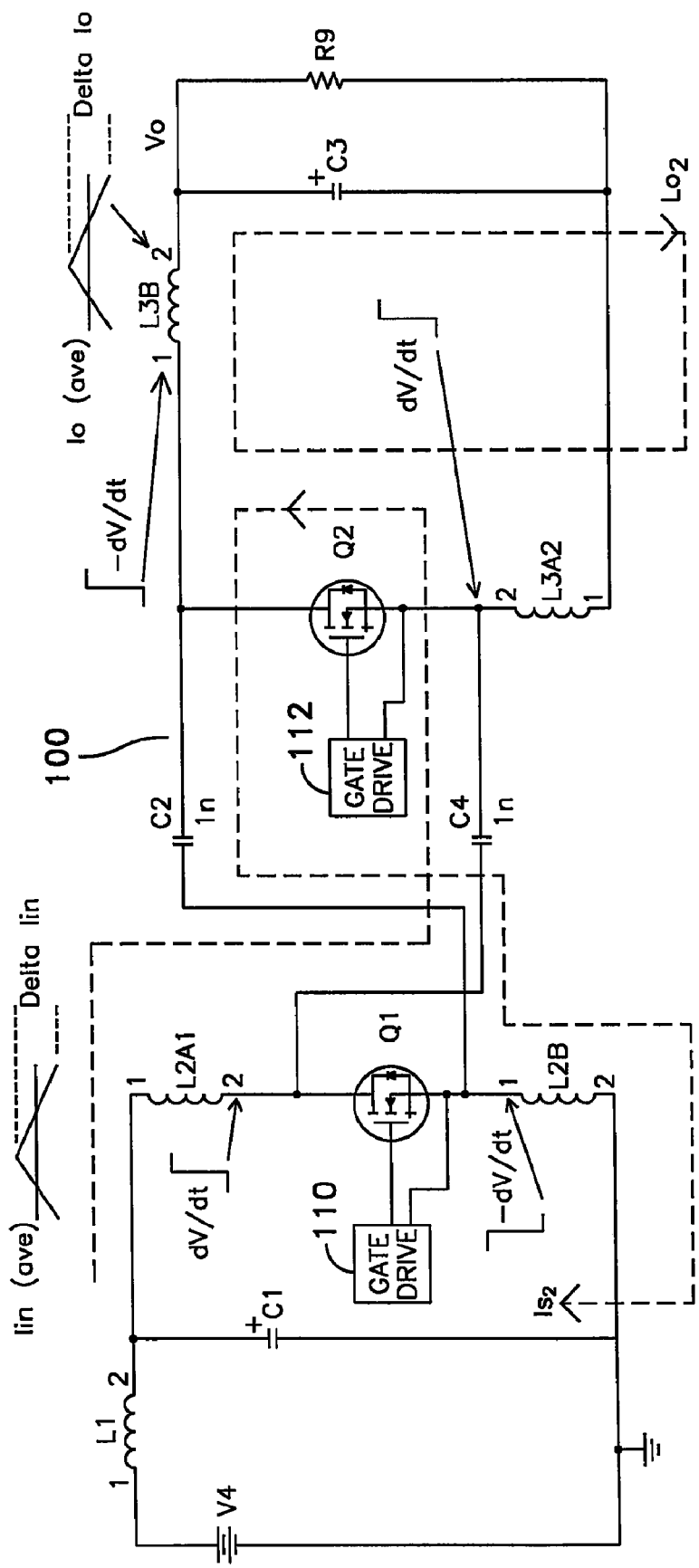
FIG. 2 is a circuit diagram of a capacitor isolated electronic power converter of FIG. 1 illustrating an alternate cycle of current flow according to an embodiment of the invention.

Referring to FIG. 2 and FIG. 3 PWMSD 110 turns gate Q1 to an "off" state 312 and PWMSD 112 turns gate Q2 to an "on" state 317 during a period $t_p$ to $t_n$. In practice there must be a short time delay between Q1 turning off and Q2 turning on to prevent the capacitor C2 and C4 from shorting out. When gate Q2 turns "on" 317 it causes a short between capacitor C2 and capacitor C4 through the connections of capacitor C2 and C4 to Q2 drain and source, respectively. When gate Q1 turns "off" inductor L2A discharges into capacitor C4 and inductor L2B discharges into capacitor C2 causing current $Is_2$ to flow from the power supply positive terminal through gate Q2 from source to drain, into capacitor C4, through capacitor C2, to terminal 1 of inductor L2B, through L2B terminal 1 and the power supply V4 return or ground in the circuit shown. During period $t_p$ to $t_n$ PWMSD 112 turns gate Q2 to an "on" state 317 allowing inductor L3A and inductor L3B to discharge through gate Q2 causing current $Io_2$ to flow into C3 and load R9.

With reference to the current flow shown in FIG. 1 and FIG. 2, an embodiment of the present invention also pertains to a process for converting power. During a first time period $t_0$ to $t_p$ PWMSD 110 turns Q1 to an "on" state providing a path for DC current $Is_1$ to flow from the voltage source Vi through the inductor L2A and inductor L2B in series. The gate Q1 is capacitively associated through C4 and C2 with the third inductor L3A and the fourth inductor L3B, respectively; which provides a path for the discharge of the energy stored in the capacitor C2, C4 through inductor L3A in series with the fourth inductor L3B and the output load R9. Note, that during $t_0$ to $t_p$ the inductor L2A and the inductor L2B, inductor L3A and the inductor L3B store energy. During the time period $t_p$ to $t_n$ PWMSD 112 turns gate Q2 to an "on" state 317. This operation essentially disconnects the path for DC current flowing to a L2A inductor and a inductor L2B in series, but instead provides a path for DC current to flow to inductor L2A and the associated separate capacitor C4 and to the inductor L2B and the associated separate capacitor C2, thus allowing inductor L3A and inductor L3B to discharge through gate Q2 causing current 102 to flow into C3 and load R9.

With reference to the foregoing description one embodiment of the invention includes a direct current power source, such as Vi in series with the first inductor L2A and any first switch for switching contact with the second inductor L2B in series with the power source return; the output load R9 in series with the third inductor L3B, which connects to any second switch for switching contact to the fourth inductor L3A in series with the output load R9 return; the third inductor L3B and the second switch for switching a first capacitive coupling C2 to the second inductor L2B; and the fourth inductor L3A and the second switch for switching the second capacitive coupling C4 to the first inductor L2A.

Apparent from FIG. 1 and FIG. 2 currents can flow from the voltage source $V_i$ to the load R9 as well as from a voltage source (not shown) placed across the load R9, or in the position of the load R9, to the source $V_i$. The bidirectional feature of the invention permits its use as a power supply so as by way of example that charges a battery placed in the electrical position of capacitor C3 and load resistor R9 or alternatively to permit the voltage source (not shown) connected to the output to charge a battery in the position of the voltage source $V_i$. Voltages on the input side are isolated from the voltages on the output side by capacitors C2, C4. The isolation between the input and output permits both positive and negative output voltage connections from the same source current. As explained below, the gates Q1, Q2 may also operate in a continuous conduction mode with zero output current.

Figure 4:
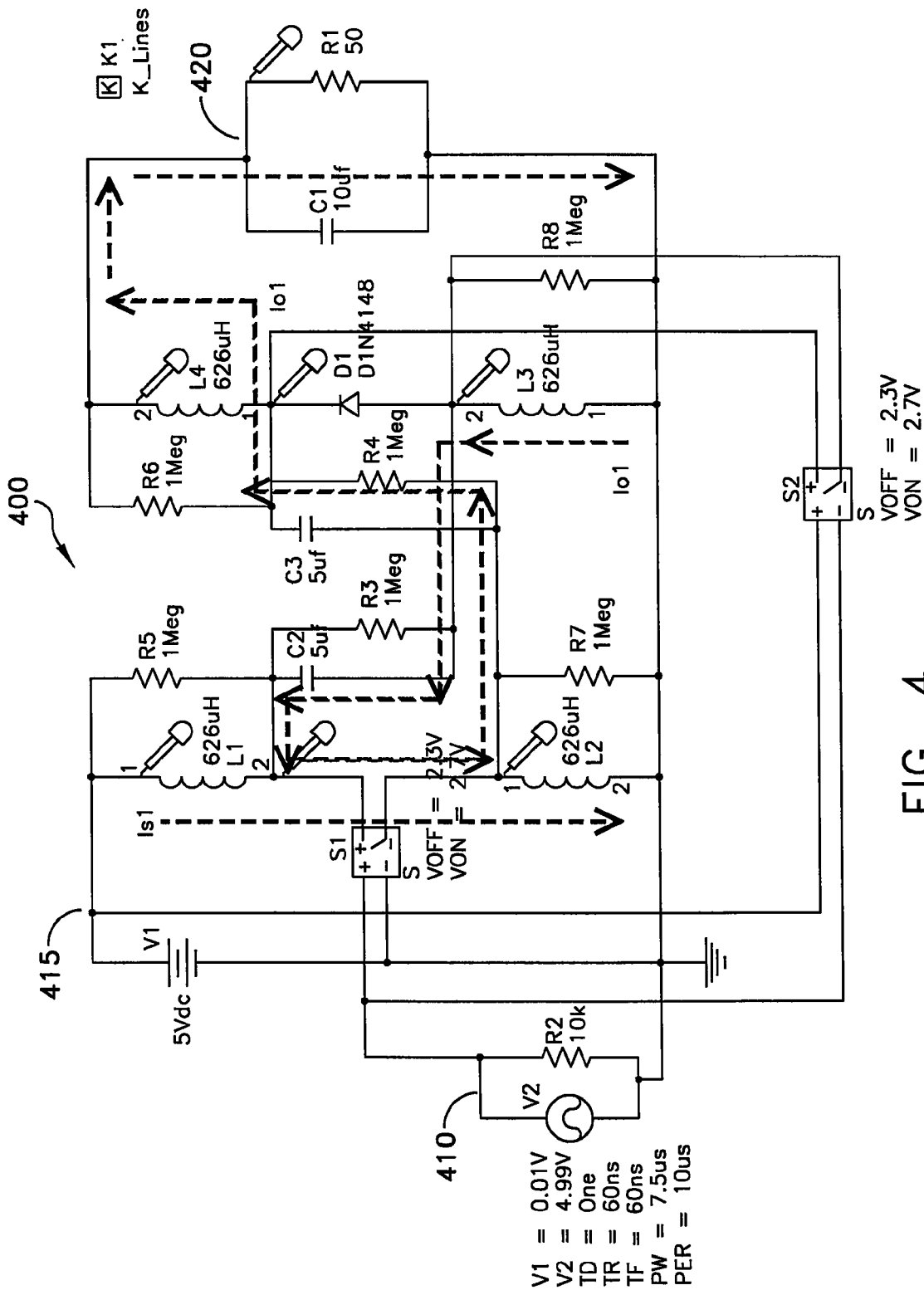
FIG. 4 is a circuit diagram of a capacitor isolated electronic power converter according to an embodiment of the invention.

Referring to FIG. 4 a capacitor isolated electronic power converter circuit 400 configuration was employed to simulate the operation of the invention as heretofore described in reference to FIG. 1 and FIG. 2. The two gate drivers 110, 112, in FIG. 1 have been replaced in FIG. 4 by switches S1 and S2. The complementary rectangular pulse trains that switch S1 and S2 in accordance with waveshape 310 and waveshape 315 in FIG. 3 have been replaced by a generator 410. The parameters of generator 410 include a 75% duty cycle, a rectangular pulse having a period of 10 microsecond period in which a positive pulse width of 7.5 microseconds forces S1 "on" (S2 "off") for that time and S1 "off" (S2 "on") for the balance of 2.5 microseconds. The rise and fall times of each pulse are 50 nanoseconds. A 5 volt power supply V1 provides input current to the converter during the entire FIG. 3 time period $t_o$ through $t_n$. Resistors, R3, R4, R5, R6, R7, R8, and diode D1 may not be required in an embodiment of the invention, but were installed for purposes of simulating the operation of the capacitor isolated electronic power converter. Current flow is illustrated for the half cycle time period $t_0$ to $t_p$ inasmuch as the current flow for the alternate half cycle is analogous to FIG. 2. Initially during FIG. 3 time period $t_0$ to $t_p$ S1 turns to an "on" state, and S2 remains in an "off" state. When S1 turns "on" current $Is_1$ flows through the series circuit L1, S1 and L2, charging inductor L1 and inductor L2 during the period $t_0$ through $t_p$ as shown in FIG. 3 chart 330 and 340 respectively. Current $Io_1$ flows through inductor L3, inductor L4 and the output C1, R1 during the period $t_0$ through $t_p$ as shown in FIG. 3 chart 330 and 340.

During the next cycle S1 turns to an "off" state 312 and the pulse generator 410 turns gate S2 to an "on" state 317 during a period $t_p$ to $t_n$. When S2 turns on 317 it causes a short between capacitor C3 and capacitor C2 through the connections of capacitor C3 and C2 respectively. Analogous to FIG. 2, the currents that were previously flowing through L1 now discharge into capacitor C2 and into capacitor C3, flowing through inductor L2. During the same time period $t_p$-$t_n$ as depicted in FIG. 3 S2 now provides a path for inductor L3 to discharge through capacitor C1 and L4 back through S2 also in a manner analogous to FIG. 2.

Figure 5:
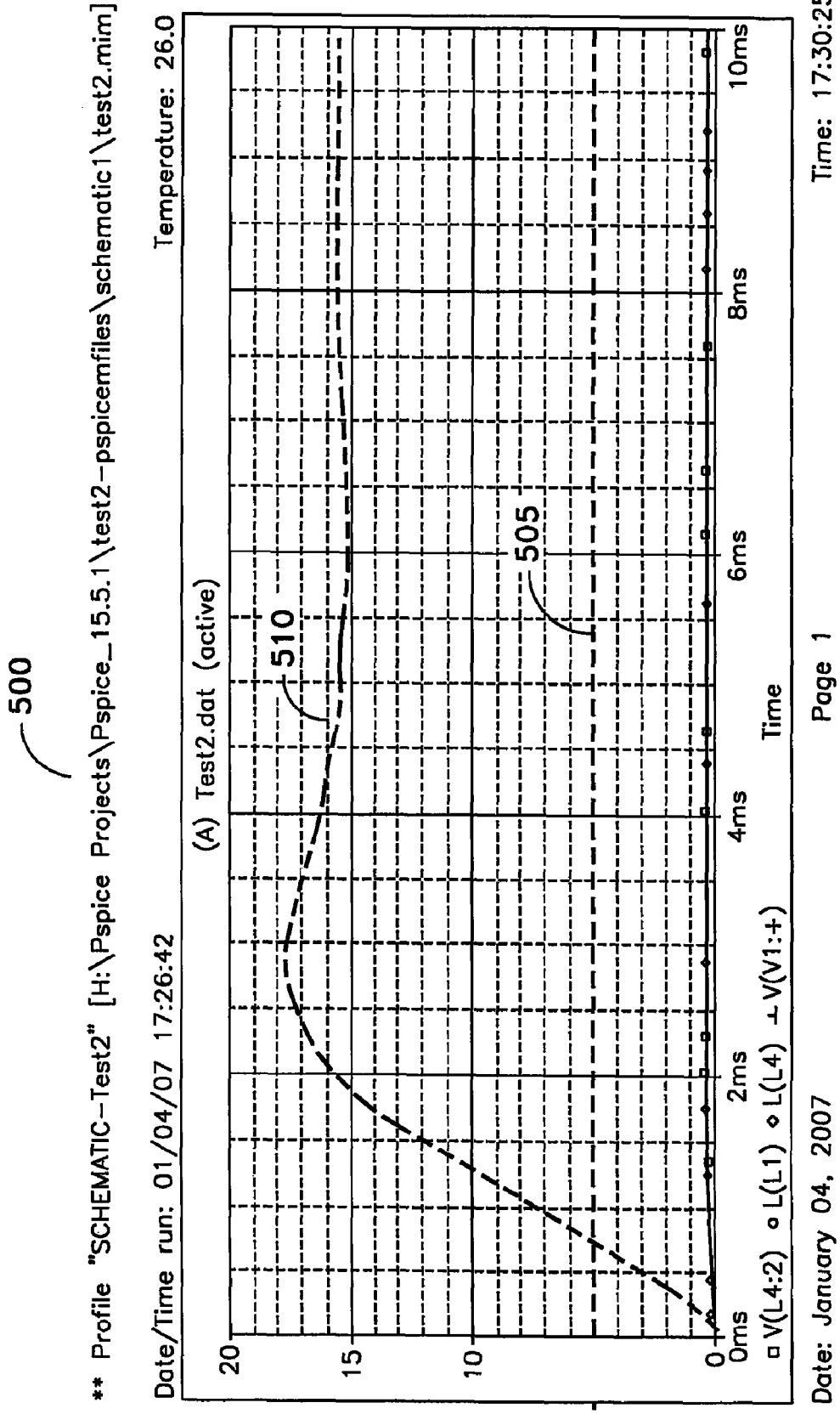
FIG. 5 is a graph showing the power supply input voltage, output voltage, and output ripple produced by an embodiment of the present invention.

FIG. 5 illustrates that for a 5 volt input V1 in FIG. 4 the circuit 400 configuration produces 15 volts output.

When the inductors in the embodiment of the present invention as depicted in FIG. 4 are subdivided and made electrically equivalent as in L1, L2 and L3, L4 the currents are balanced such that the injection and removal of unwanted injected currents is achieved. Additionally, the chassis injected switch currents and current pulses are injected and removed from the heat sink simultaneously, which lowers the common mode noise generation, by providing a return path for the chassis injected currents.

Figure 6:
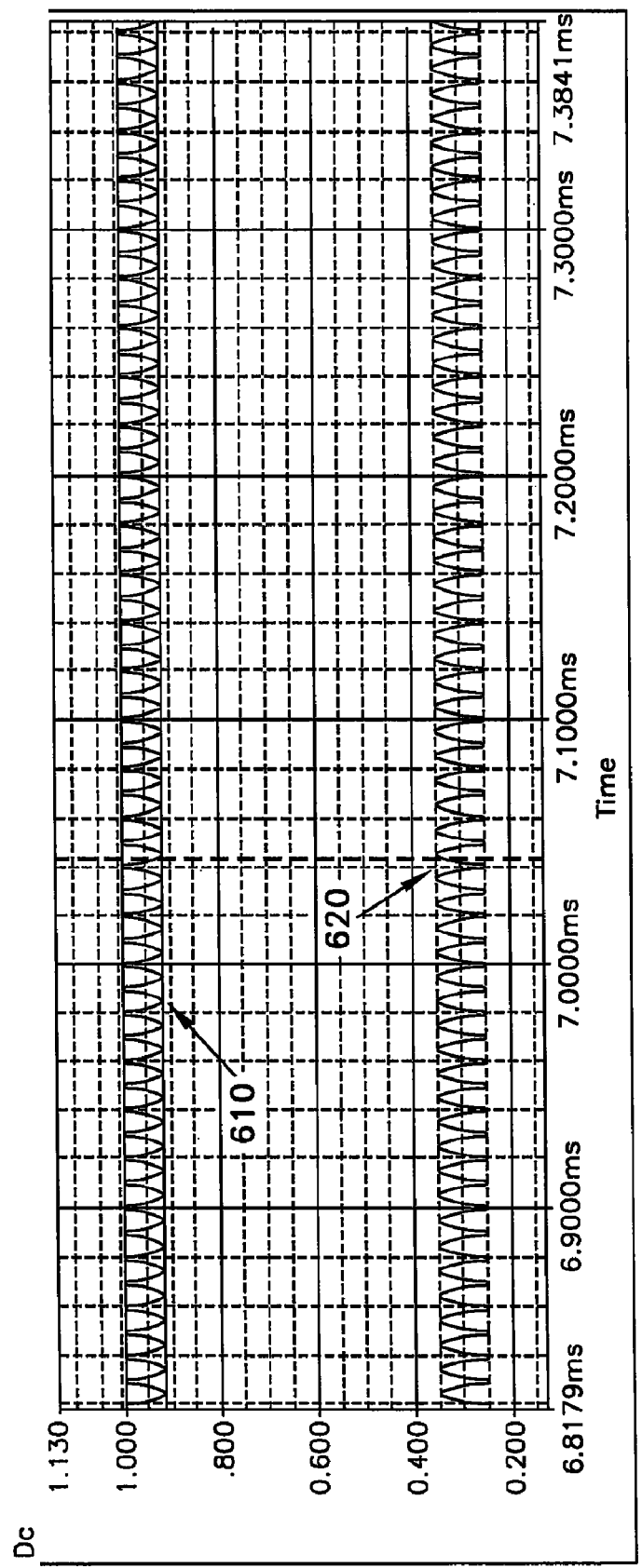
FIG. 6 is a graph showing the input ripple current and the output ripple current produced by an embodiment of the present invention.

As will be apparent to those skilled in the art of electrical engineering FIG. 1 and FIG. 2 in operation provides low or no cross talk to the other power supplies in electrical proximity since the input is a steady state DC and not pulsed as in a conventional buck-boost power supply. The lack of any large current steps on the input requires little or no input filtering or filtering down stream prior to the output. FIG. 6 shows the magnitude of ripple currents produced by the invention as described with reference to FIG. 4. Trace 610 shows a generally cyclically varying input current as measured flowing from the power supply V1 of FIG. 4. Trace 620 shows a generally cyclically varying output current as measured flowing from through the load resistor R1, C1 of FIG. 4. Note that the peak-to-peak ripple magnitude at input 610 is approximately equal to the ripple 620 at the output. This occurs when the inductances are substantially equal in value.

In the embodiment of the present invention illustrated depicted with reference to FIG. 1 and FIG. 2 the use of capacitive coupling between the first bipolar gate Q1 and the second bipolar gate Q2 in the form of C2 and C4 provides for galvanic isolation between the input and the output. Furthermore, the isolation between the input side and the output side to accommodates the use of multiple output supplies. The invention further provides a floating output with respect to the input, having either voltage polarity and having the output voltages either stepped up or down with respect to the input voltage.

Referring again to FIG. 4 the capacitor isolated electronic power converter circuit 400 configuration may operate in a mode with having various duty cycles relative to the switching of S1 and S2. For example, in one simulation a duty cycle of approximately 0.35 and an input voltage V1 of substantially 9 VDC produced a positive output across C1 (10 µf) and R1 (50 ohms) of substantially +5 VDC. As will be apparent from such operation, the converter can receive an input voltage greater than its output. One such application for such as configuration would be to charge the source battery V1. Essentially this feature permits power flow from source to load as well as load to source and might be employed to charge a battery and discharge a battery with the same configuration as shown in FIG. 1.

Figure 7:
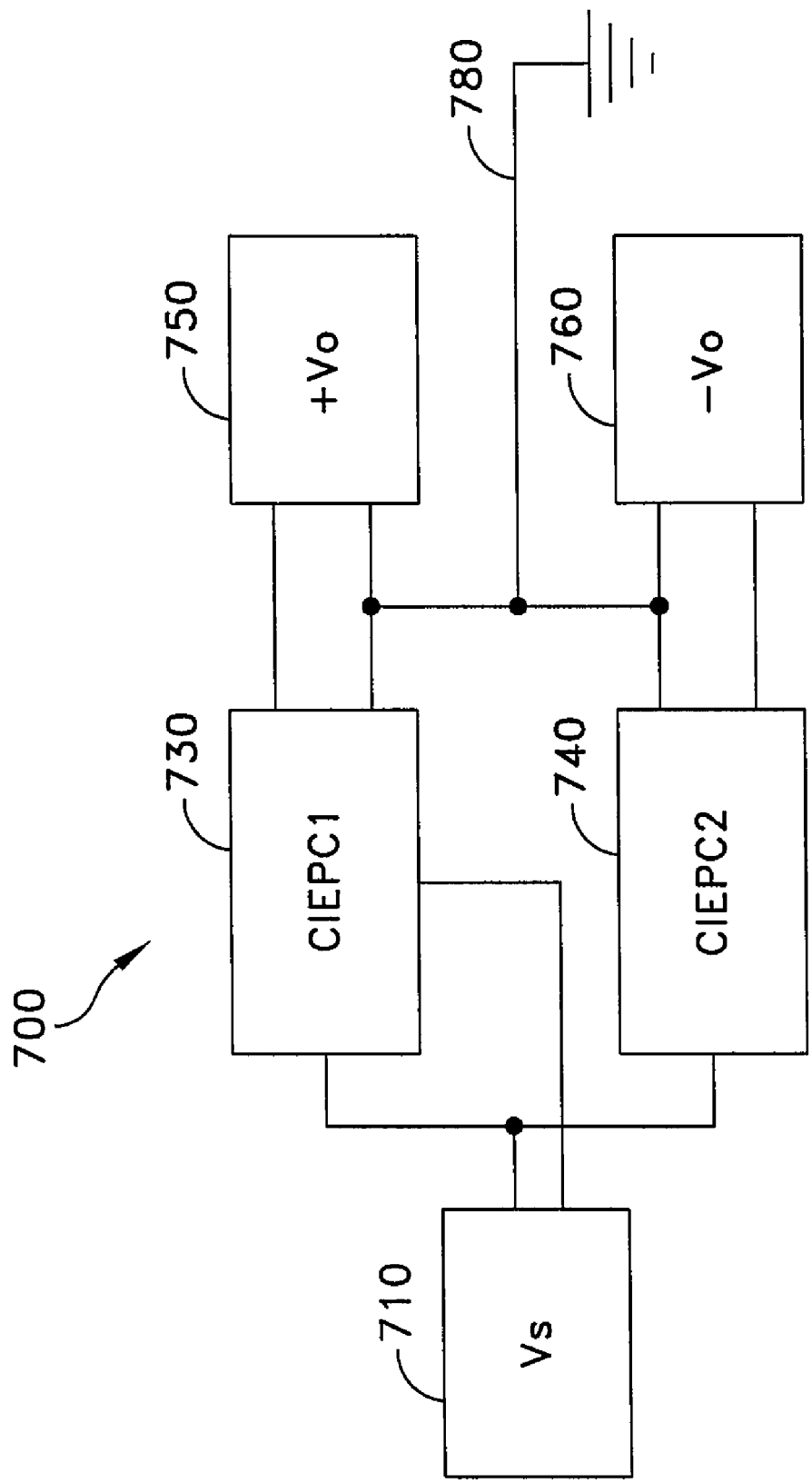
FIG. 7 is a circuit diagram of a capacitor isolated electronic power converter according to an embodiment of the invention.

One embodiment of the present invention is shown in FIG. 7 where a capacitor isolated electronic power converter 700 of the present invention comprises at least two electronic power converters 730, 740 and having a common direct current input voltage 710, separate outputs 750, 760 and a common output ground 780. Each power converter 730, 740 has a capacitor for isolating the input voltage from the output voltage and transfers input power to the respective separate outputs 760, 750.

More specifically, FIG. 7 illustrates two capacitor isolated electronic power converters ("CIEPC") 730, 740 in accordance with an embodiment of the invention. Each CIEPC reflects at least an operation in accordance with an embodiment of the invention as shown in FIG. 1. Each CIEPC 730, 740 is supplied with a DC input from the same voltage source

710. Each CIEPC 730, 740 also provides for at least four energy storage elements, such as charging inductor L1, L2 L3 and L4 (See, FIG. 1). Each CIEPC 730, 740 capacitively isolates the voltage source 710 from its respective output 750, 760. The outputs 750, 760 share a common ground 780. The outputs 750, 760 essentially float in series with a midpoint common ground 780 thus achieving both positive and negative outputs from common source voltage.

It is understood that portions of the circuits, capabilities' displayed and functionality described herein can be implemented in hardware, software, firmware, or combinations thereof. In a preferred embodiment, the circuit in to respect to FIG. 1 gate drivers 110, 112 may be implemented in software stored in the memory. It is to be appreciated that, where the functionality is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A capacitor isolated electronic power converter comprising:
    a power source in series with a first inductor which connects to a first switch for switching contact to a second inductor in series with a power source return;
    an output load in series with a third inductor which connects to a second switch for switching contact to a fourth inductor in series with an output load return;
    said third inductor and second switch for switching connected through a first capacitive coupling to the second inductor; and
    said fourth inductor and second switch for switching connected through a second capacitive coupling to the first inductor;
    wherein the first and second capacitive coupling isolates the power source from the output load.

2. The capacitor isolated electronic power converter of claim 1, wherein the first switch for switching contact comprises a bipolar gate.

3. The capacitor isolated electronic power converter of claim 1, wherein the second switch for switching contact comprises a bipolar gate.

4. The capacitor isolated electronic power converter of claim 2, wherein the first inductor connects to the bipolar gate one of a drain or source.

5. The capacitor isolated electronic power converter of claim 2, wherein the second inductor connects to the bipolar gate one of a drain and source.

6. The capacitor isolated electronic power converter of claim 3, wherein the third inductor connects to the bipolar gate one of a drain and source.

7. The capacitor isolated electronic power converter of claim 3, wherein the fourth inductor connects to the bipolar gate one of a drain and source.

8. The capacitor isolated electronic power converter of claim 1, wherein the first and second capacitive couplings provide for galvanic isolation between the power source and the output load.

9. A capacitor isolated electronic power converter comprising:
    a voltage source in series with a pair of inductors and separated by a first switch for switching having a first pole and a second pole;
    wherein the first pole of the first switch for switching is cross coupled through a first capacitor to a second switch for switching having a first pole and a second pole; and
    wherein the second pole of the first switch for switching is cross coupled through a second capacitor to the second switch for switching first pole; and
    said second switch for switching first pole is connected in series with a first associated inductor and an output; and
    said second switch for switching second pole is connected in series with a second associated inductor and the output return;
    wherein the first and second capacitors isolate the voltage source from the output.

10. The capacitor isolated electronic power converter of claim 9, wherein current flows from the output to the voltage source.

11. A capacitor isolated electronic power converter comprising:
    at least two electronic power converters having a common input voltage source, separate outputs and a common output reference potential; each power converter having a first and a second capacitor isolating the input voltage source from the output and for transferring input power to the respective separate outputs,
    wherein the common output reference potential is isolated from an input voltage source reference potential by at least one of the first and second capacitors.

12. A process for converting power comprising:
    providing a first path for DC current to flow during a first time period to a first inductor and a second inductor in series, the first inductor and the second inductor each having an associated separate capacitor connecting to a third and a fourth inductor respectively;
    providing a second path for the discharge of the energy stored in the third inductor in series with the fourth inductor and the output load;
    disconnecting the first path for DC current to flow during a second time period to the first inductor and the second inductor in series; and
    providing a third path for DC current to flow through the first inductor and the associated separate capacitor and to the second inductor and the associated separate capacitor, and providing a fourth path for the discharge of the energy stored in the third inductor in series with the fourth inductor and the output load.

13. The process of claim 12 further including balancing the injection currents and removing unwanted injected currents from the converter power chassis.

14. The capacitor isolated electronic power converter of claim 11, wherein the at least two electronic power converters comprise first and second electronic power converters, the first power converter outputting a positive voltage, the second power converter outputting a negative voltage.

15. The capacitor isolated electronic power converter of claim 11, wherein each of the at least two electronic power converters supplies a respective one of a positive and a negative output voltage simultaneously.

16. The capacitor isolated electronic power converter of claim 11, wherein each of the electronic power converters comprises at least four energy storage elements.

17. The capacitor isolated electronic power converter of claim 16, wherein the at least four energy storage elements comprise four inductors;
the input voltage source connected to a first inductor in selective contact with a second inductor connected to an input voltage source return;
the output connected to a third inductor in selective contact with a fourth inductor connected to an output voltage return;
the third inductor connected through a first capacitive coupling to the second inductor; and
the fourth inductor connected through a second capacitive coupling to the first inductor;
wherein the first and second capacitive coupling isolates the input voltage source from the output.

\* \* \* \* \*